(12) United States Patent
Sakamoto

(10) Patent No.: US 6,515,647 B1
(45) Date of Patent: Feb. 4, 2003

(54) MATRIX DISPLAY APPARATUS

(75) Inventor: Tsutomu Sakamoto, Saitama-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/534,324

(22) Filed: Mar. 24, 2000

(30) Foreign Application Priority Data

Mar. 24, 1999 (JP) .......................................... 11-079623

(51) Int. Cl.[7] .................................................. G09G 3/36
(52) U.S. Cl. ............................. 345/99; 345/100; 345/96
(58) Field of Search ........................ 345/3.3, 3.4, 698, 345/699, 673, 674, 96, 98

(56) References Cited

U.S. PATENT DOCUMENTS

| | | | | |
|---|---|---|---|---|
| 5,448,259 A | * | 9/1995 | Hidaka | 345/99 |
| 5,461,424 A | * | 10/1995 | Shimizu | 348/443 |
| 5,905,540 A | * | 5/1999 | Miyashita et al. | 348/674 |
| 6,072,457 A | * | 6/2000 | Hashimoto et al. | 345/100 |

FOREIGN PATENT DOCUMENTS

JP        6-14280        1/1994

* cited by examiner

Primary Examiner—Kent Chang
Assistant Examiner—Tom V. Sheng
(74) Attorney, Agent, or Firm—Pillsbury Winthrop LLP

(57) ABSTRACT

A matrix display apparatus having a display panel device provided with a plurality of data-lines, a plurality of scan-lines which are arranged in a matrix and a controller for controlling the display panel device, wherein the controller generates a write instruction signal (i) for instructing the ($a \times n + b$)-th scanning line image signal of the first field image signal to be written on adjoining two scan-lines (a and b are constants, a>b, n is a zero or a positive integer), (ii) for instructing the other scanning line image signals of the first field image signal to be written on one of the scan-lines, (iii) for instructing the ($a \times n + c$)-th scanning line image signal of the second field image signal to be written on adjoining two scan-lines (c is a constant, a>c) and (iv) for instructing the other scanning line image signals of the second field image signal to be written on one of the scan-lines.

4 Claims, 9 Drawing Sheets

MATRIX DISPLAY APPARATUS

FIELD OF THE INVENTION

The present invention relates to a matrix display apparatus. The present invention is effective for using matrix displays, such as liquid-crystal device (LCD) panels, as High-Vision resolution display devices.

BACKGROUND OF THE INVENTION

It is expected that new television systems, such as digital satellite broadcast systems and digital terrestrial broadcast systems will take place of the conventional NTSC and MUSE systems in near future across the 21st century.

In the NTSC system, a 480 lines interlaced scanning system has been adopted. In the Hi-Vision broadcast systems adopting the MUSE system, a total of 1125 scan lines are used, while 1035 scan lines present on an actually-visible display screen. Therefore, conventional monitors and television (TV) receivers were enough to be compatible to a total of 1125 scan lines and the actually-visible 1035 scan lines.

Incidentally, in plans of digital broadcasts, such as the DTV system decided in the United States and similar systems on diagram boards in the world, a variety of scanning systems are proposed. For example, a 480 lines interlaced scanning system (hereinafter referred to 480i), a 480 lines progressive scanning system (hereinafter referred to 480p), a 1080 lines interlaced scanning system (hereinafter referred to 1080i) and a 720 lines progressive scanning system (hereinafter referred to 720p) have been planned.

Therefore, it is needed that the monitors and the TV receivers is compatible to not only the conventional NTSC and MUSE system broadcasts, but also to a variety of scanning systems.

Referring now to FIG. 12, a construction of conventional TV receivers will be described.

In FIG. 12 a DTV (digital television) demodulator 11 demodulates digital color TV signals from an OFDM (Orthogonal Frequency Division Multiplexing)-modulation digital color TV broadcast signal received through an antenna, such as a parabola antenna. A DTV decoder 12 decodes MPEG-2 encoded signals from the DTV demodulator 11. An analog-to-digital (A/D) converter 13 converts analog signals of 1080i scan format, or analog signals of 1035i scan format into 10-bit order digital signals. Here, color TV signals definitely consist of three-color signals, i.e., a luminance signal (Y) and two color-difference signals (Pr, Pb). Thus the A/D converter 13 is actually comprised of three units (not shown). A 1080i/720p converter 14 converts 1080i scan format signals to 720p scan format signals by alternatively storing the odd and even fields each consisting of 540 scan lines into a frame memory, and applying a motion-adaptive processing etc.

In this embodiment, although an exemplified conversion from mainly a 1080i format to a 720p format is described, the same goes for a conversion from a 1035i format to the 720p format. By the way, the conventional Hi-Vision system signal also utilizes a total number of 1125 lines the same as that of the digital TV system signal. Thus, by processing 45 lines of them as lines in a non-image area, i.e., a vertical retrace period, the same circuit configuration and operation can be applied to both of the Hi-Vision system and the digital TV system.

An analog-to-digital converter (A/D converter) 15 converts the 480i scan format or the 480p scan format from analog form to digital form. A 480i(p)/720p converter 16 converts the digital signals from the A/D converter 15 from a 480i(p) scan format to a 720p scan format. Wherein, 480i scan format signals are converted into 720p scan format signal while storing odd and even fields each consisting of 240 scan lines into a field memory and performing a motion-adaptive signal processing. On the other hand, 480p scan format signals are converted into the 720p scan format signals in every fields.

A selector 17 selects either the digital signals from the 1080i/720p converter 14 or the 480i(p)/720p converter 16. A D/A converter 18 converts the image signals selected by the selector 17 from digital form back to analog form. Since color displays require three signals, i.e., a luminance signal (Y signal) and two color-difference signals (Pr, Pb), the D/A converter 18 is actually comprised of three units (not shown).

An LCD driver 19 adequately processes the luminance signal Y and the color-difference signals Pr, Pb to drive an LCD panel 21. The LCD driver 19 comprises a matrix circuit for restoring three primary color signals R, G, B from the luminance signal Y and the color-difference signals Pr, Pb, a gamma correction circuit for correcting voltage-luminance characteristics curve of the LCD panel 21, a polarity alternator for alternating polarities of signals given to the LCD panel 21. Here, the alternate-driving of LCDs is performed for preventing deteriorations of LCDs caused by applying only one polarity signal to LCD panels.

An LCD controller 20 controls timings of enabling scan lines (rows) y1, y2, y3, . . . and data lines (columns) x1, x2, x3, . . . of the LCD panel 21 in synchronism with the drive signals supplied from the LCD driver 19. When the LCD panel 21 is of a low-cost and of a midrange resolution, 720 units of scan lines (rows) y1, y2, y3, . . . are vertically aligned, while 1280 units of data-lines (columns) x1, x2, x3, . . . are laterally aligned.

The LCD controller 20 deals with three drive signals associated to the luminance signal Y and the color-difference signals Pr, Pb. Thus the LCD controller 20 is actually comprised of three units (not shown). In the receiver, as shown in FIG. 12 the LCD panel 21 accepts three types of drive signals. The first drive signal originates from the 1080i scan format signal which is obtained by demodulating the DTV-modulation transmitting signal in the DTV demodulator 11 and then decoded in the DTV decoder 12. The second drive signal originates from the analog luminance signal and color-difference signals of the 1080i or the 1035i scan format which are supplied from conventional MUSE decoders or MUSE disc players to the A/D converter 13. The 1080i format signals associated to the first and the second drive signals are converted into the 720p scan format signal in the 1080i/720p converter 14. The third drive signal originates from the 480i or the 480p scan format signals such as the conventional NTSC signals supplied to the A/D converter 15 and then converted to the 720p scan format signal in the 480i(p)/720p converter 16.

Since all of the above-mentioned three drive signals are converted their formats into the 720p scan format before the LCD panel 21, if their scanning line signals are supplied one by one into the LCD panel 21 in their order, a correct image corresponding to the scan format conversion algorism is displayed on the LCD panel 21.

Although the A/D converter 13 can convert analog 1080i or 1035i scan format signals into 8-bit or 10-bit digital signals, it requires a very high sampling frequency of 75 MHz and also three units of expensive converters for the luminance signal Y and the color-difference signals Pr and Pb, respectively. Moreover, since separate type MUSE decoders and disc players are not presently in common, input terminals for the MUSE decoders and disc players are rarely used. Nevertheless, an equipment of three expensive A/D converters and their peripheral devices has caused the burden on great cost. If their costs could be suppressed sufficiently close to a price reasonable for customers, such an attempt of reducing costs can contribute for a proliferation of monitors and TV receivers compatible not only to the conventional NTSC and MUSE system broadcasts, but also to a variety of scanning systems.

SUMMARY OF THE INVENTION

With consideration for the above problems, the object of the present invention is to provide a matrix display apparatus to which analog signals can be directly supplied thus eliminating the need for expensive A/D and/or D/A converters, by devising driving schemes of the LCD panels.

To achieve the above objects, a matrix display apparatus according to a first aspect of the present invention includes, a display panel device provided with a plurality of data-lines and a plurality of scan-lines which are arranged in a matrix and a controller for controlling the display panel device, wherein the controller generates a write instruction signal, (i) for instructing an (a×n+b)-th scanning line image signal of the first field image signal to be written on adjoining two scan-lines (a and b are constants; a>b; n is a zero or a positive integer), (ii) for instructing the other scanning line image signals of the first field image signal to be written on one of the scan-lines, (iii) for instructing an (a×n+c)-th scanning line image signal of the second field image signal to be written on adjoining two scan-lines (c is a constant; a>c), and (iv) for instructing the other scanning line image signals of the second field image signal to be written on one of the scan-lines.

A matrix display apparatus according to a second aspect of the present invention includes, a display panel device provided with a plurality of data-lines and a plurality of scan-lines which are arranged in a matrix and a controller for controlling the display panel device, a data-driver for supplying an interlaced format image signal to the data-lines of the display panel device in accordance with a write instruction signal provided from the controller, and a scan-driver for shifting an active scan-line in the vertical direction of the display panel device in accordance with the line-shift instruction signal provided from the controller, wherein the controller generates a write instruction signal, (i) for instructing an (a×n+b)-th scanning line image signal of the first field image signal to be written on adjoining two scan-lines, (ii) for instructing the other scanning line image signals of the first field image signal to be written on one of the scan-lines, (iii) for instructing an (a×n+c)-th scanning line image signal of the second field image signal to be written on adjoining two scan-lines, and (iv) for instructing the other scanning line image signals of the second field image signal on one of the scan-lines.

A matrix display apparatus according to a third aspect of the present invention includes, a display panel device provided with a plurality of data-lines and a plurality of scan-lines which are arranged in a matrix, and a controller for controlling the display panel device, a data-driver for supplying the interlaced format image signal to the data-lines of the display panel device in accordance with a write instruction signal provided from the controller, a first scan-driver for shifting an odd-numbered active. scan-line in the vertical direction in accordance with the line-shift instruction signal provided from the controller, and a second scan-driver for shifting an even-numbered active scan-line one by one in the vertical direction in accordance with the line-shift instruction signal provided from the controller, wherein the controller generates a write instruction signal, (i) for instructing either of the first and second scan-drivers to supply the image signals of 3n-th and (3n+1)-th scanning line image signals of a 2k-th field (k is an arbitrary integer) to the display panel device, (ii) for instructing both of the first and second scan-drivers to supply the image signals of the (3n+1)-th scanning line image signals of the 2k-th field to the display panel device, (iii) for instructing both of the first and second scan-drivers to supply the image signals of a (3n+2)-th scanning line image signal of the 2k-th field to the display panel device, (iv) for instructing both of the first and second scan-drivers to supply the image signals of the 3n-th scanning line image signal of the 2k-th field to the display panel device, (v) for instructing either of the first and second scan-drivers to supply the image signals of the (3n+1)-th and (3n+2)-the scanning line image signals of the (2k+1)-th field to the display panel device, and (vi) for instructing either of the first and second scan-drivers to supply the image signals of the (3n+1)-th and (3n+2)-the scanning line image signals of the (2k+1)-th field to the display panel device.

Other than the features as those of the second and third aspects, a matrix display apparatus according to a fourth aspect of the present invention further includes, an LCD (liquid-crystal display) panel device and a polarity alternator for alternating the polarity of the image signal to be provided to the LCD panel device for every horizontal scanning line, wherein the polarity alternator (i) renders the image signals in 4m-th and (4m+3)-th (m is an arbitrary integer) fields to a first polarity and (ii) renders the image signal in (4m+1)-th and (4m+2)-th fields to a second polarity.

Other than the features as those of the second and third aspects, a matrix display apparatus according to a fifth aspect of the present invention further includes, an LCD (liquid-crystal display) panel device and a polarity alternator for alternating a polarity of the image signal to be supplied to the LCD panel device for every horizontal scanning line, wherein the polarity alternator (i) renders 3n-th and (3n+1)-th scanning line image signals in a 2k-th field to a first polarity, (ii) renders a (3n+2)-th scanning line image signal in the 2k-th field to a second polarity, (iii) renders the (3n+1)-th and (3n+2)-th scanning line image signals in a (2k+1)-th field to the second polarity, (iv) renders the 3n-th scanning line image signal in the (2k+1)-th field to the first polarity, and (iv) renders the 3n-th scanning line image signal in the (2k+1)-th field to the first polarity.

A matrix display apparatus according to a sixth aspect of the present invention includes, a display panel device provided with a plurality of data-lines and a plurality of scan-lines which are arranged in a matrix, and a controller for controlling the display panel device, a data-driver for supplying an interlaced format image signal to the data-lines of the display panel device in accordance with a write instruction signal supplied from the controller, and a scan-driver for shifting an active scan-line in the vertical direction of the display panel device in accordance with the line-shift instruction signal supplied from the controller, wherein the controller generates a control signal (i) for disabling the scan driver when an (a×n+b)-th scanning line image signal is supplied in a 2k-th field and (ii) for disabling the scan driver when an (a×n+c)-th scanning line image signal is supplied in a (2k+1)-th field.

A matrix display apparatus according to a seventh aspect of the present invention includes, a display panel device provided with a plurality of data-lines and a plurality of scan-lines which are arranged in a matrix, a controller for controlling the display panel device, a data-driver for supplying the interlaced format image signal to the data-lines of the display panel device in accordance with a write instruction signal supplied from the controller, a first scan-driver for shifting an odd-numbered active scan-line in the vertical direction in accordance with the line-shift instruction signal supplied from the controller, and a second scan-driver for shifting an even-numbered active scan-line one by one in the vertical direction in accordance with the line-shift instruction signal supplied from the controller, wherein the controller generates a control signal, for disabling the first and second scan drivers when an (a×n+b)-th scanning line image signal is supplied in a 2k-th field, and for disabling the first and second scan drivers when an (a×n+c)-th scanning line image signal is supplied in a (2k+1)-th field and for enabling the first and second scan drivers when scanning line image signal other than the (a×n+c)-th scanning line image signal are supplied in the (2k+1)-th field.

According to the above-described schemes, it is able to display analog 1080i scan format signals without the need for expensive A/D and/or D/A converters and thus the cost of the matrix display apparatus is extensively reduced.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Referring now to the attached diagrams FIGS. 1 to 11, a preferred embodiment of the matrix display apparatus according to the present invention will be described.

Figure 1:
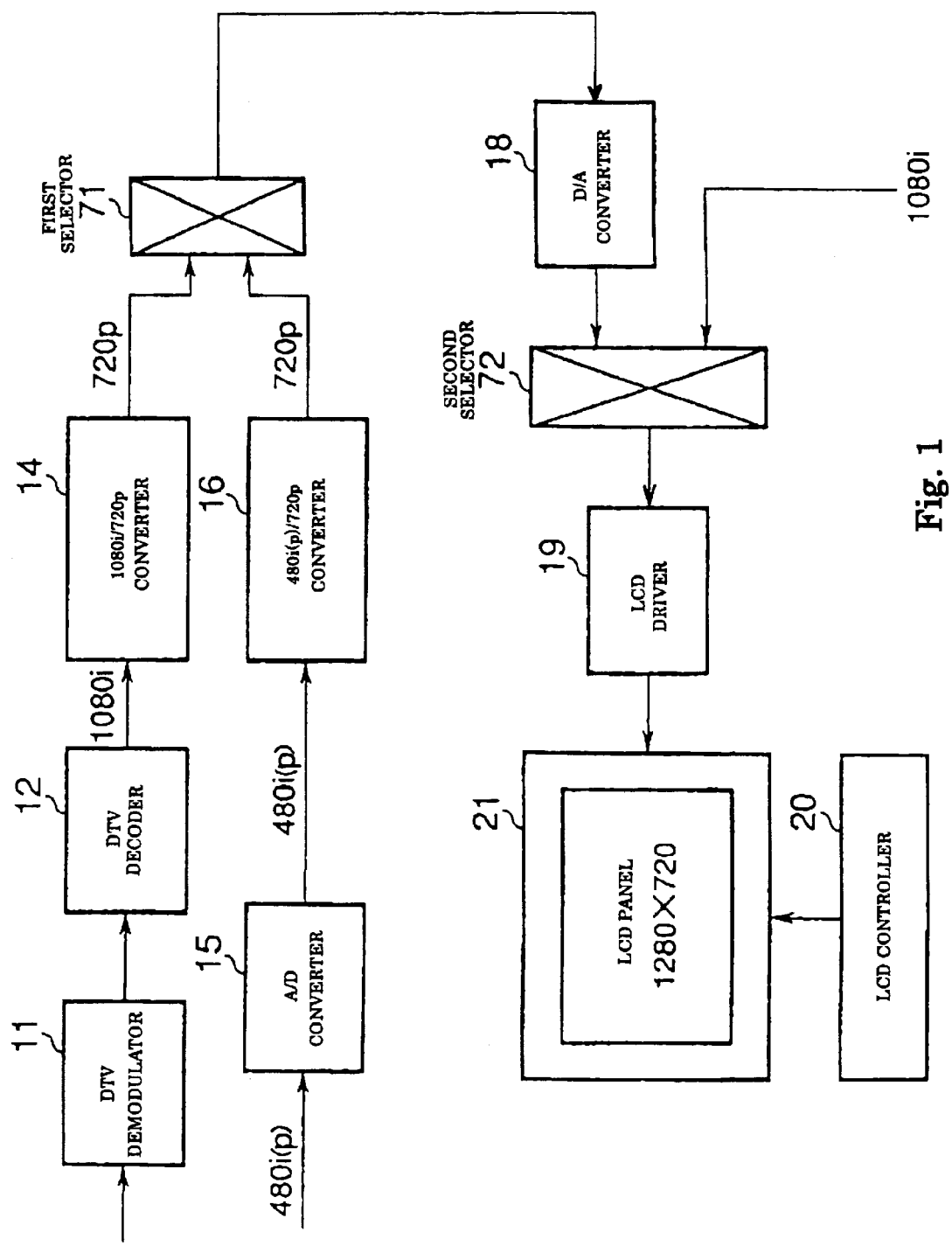
FIG. 1 is a block diagram showing a first embodiment of the matrix display apparatus according to the present invention.
Figure 10:
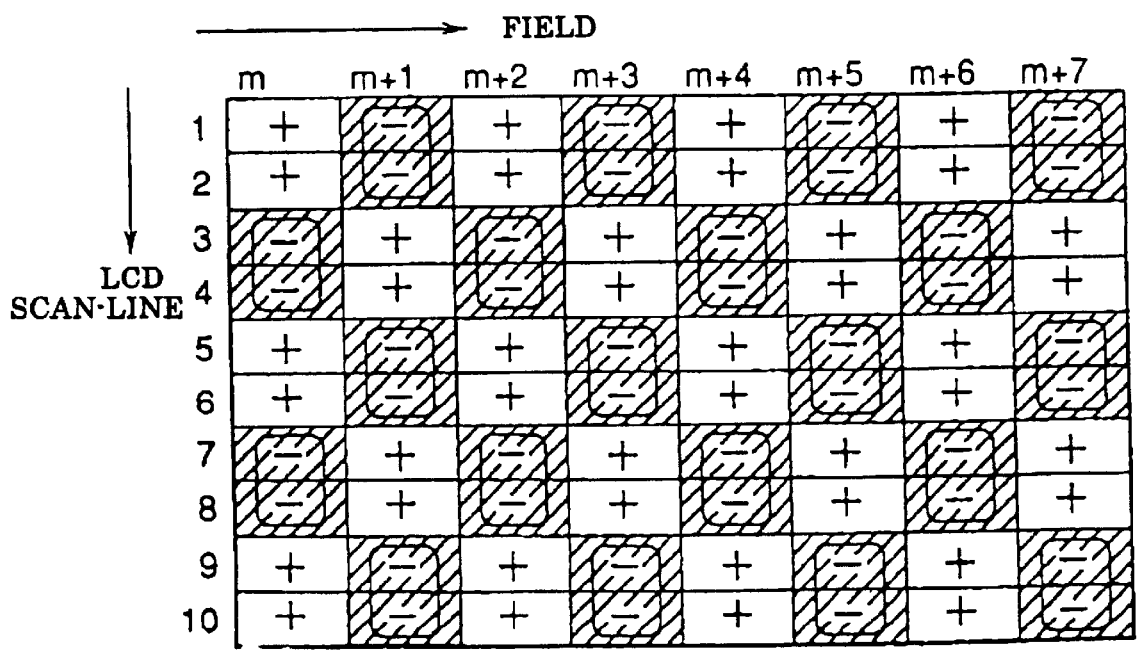
FIG. 10 is a diagram for explaining a polarity-change pattern of signals for driving the LCD panel in the third embodiment of the present invention.
Figure 11:
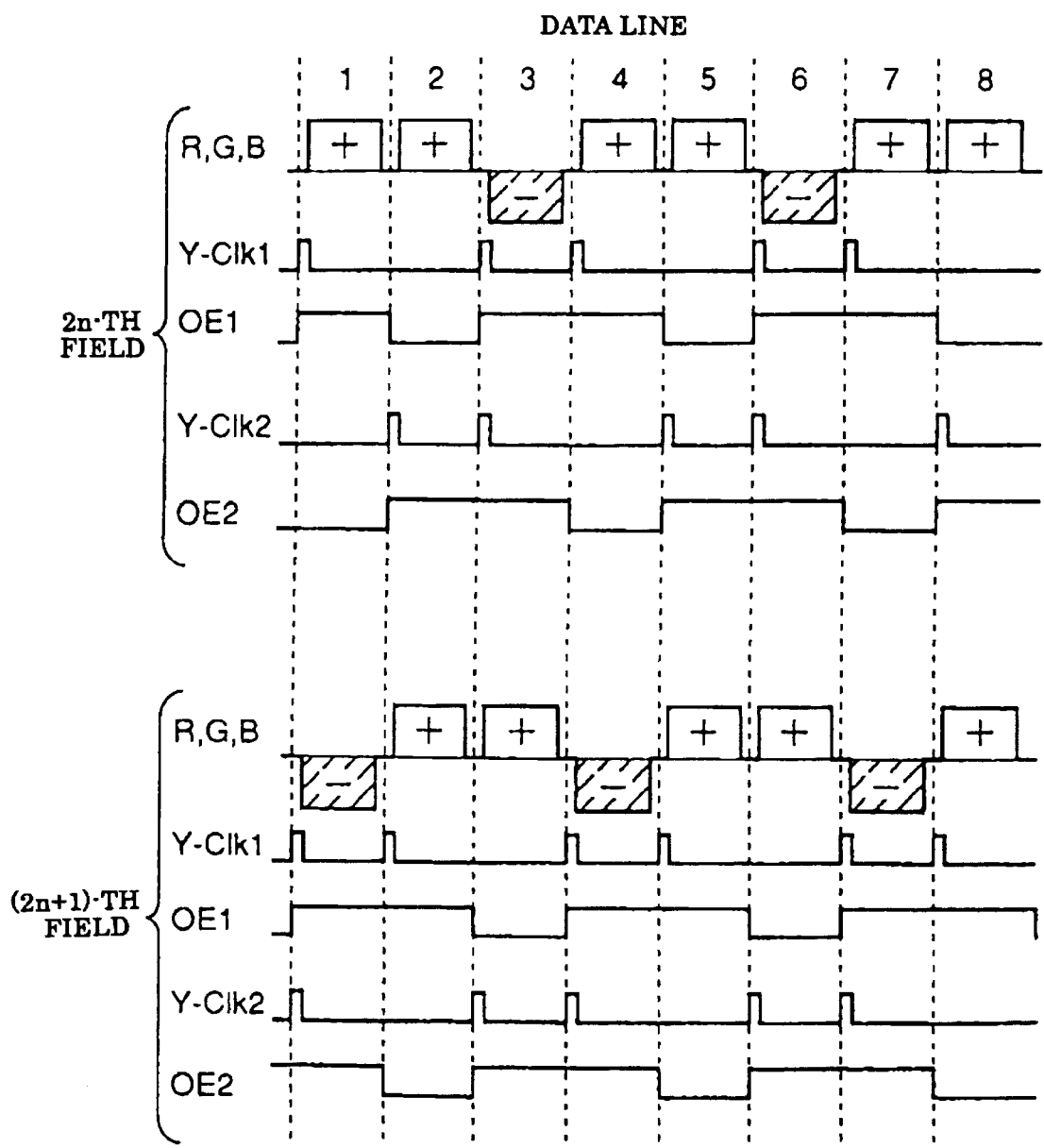
FIG. 11 is a timing diagram for driving the LCD panel in the third embodiment of the present invention.
Figure 12:
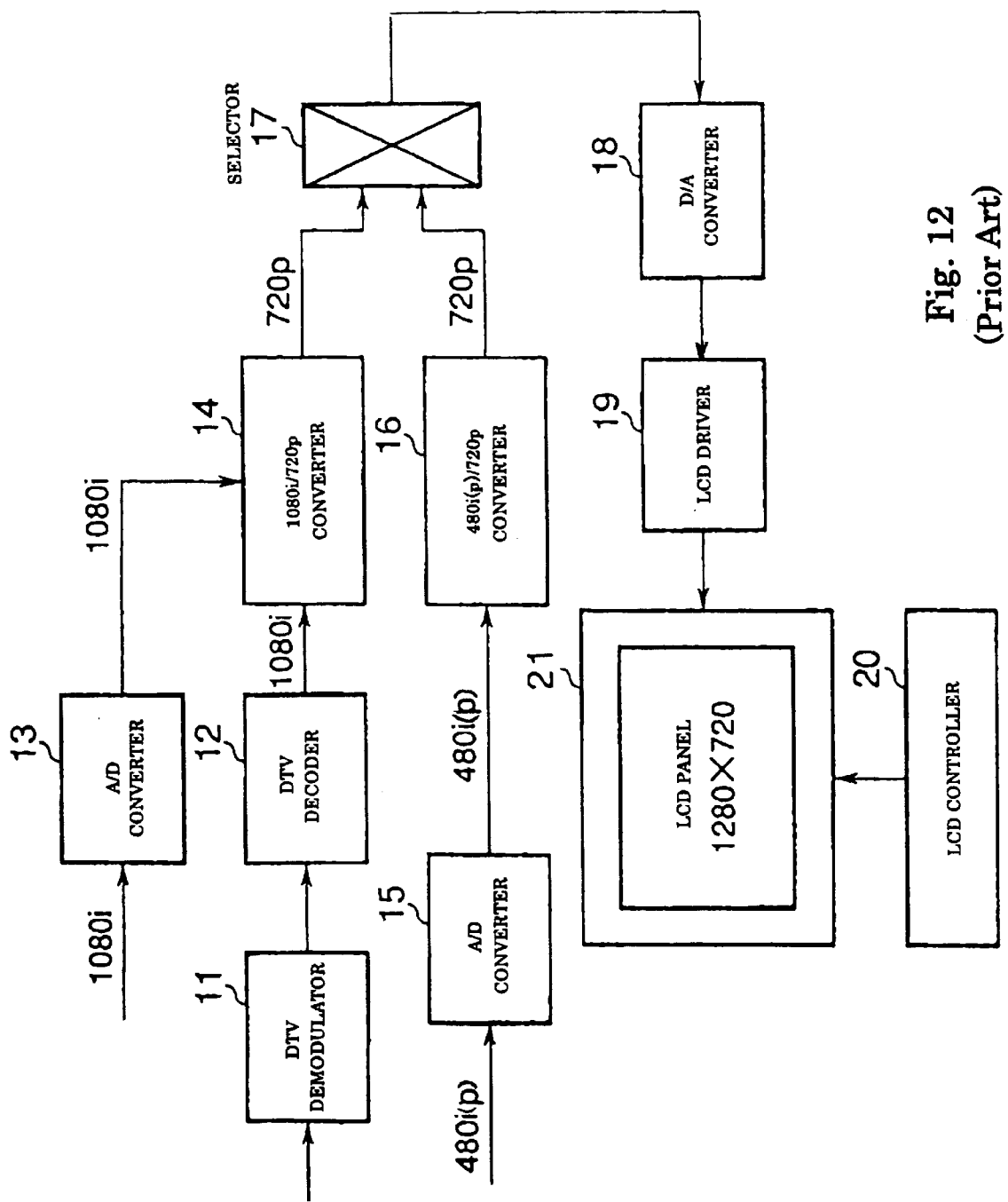
FIG. 12 is a block diagram showing a conventional digital-ready TV receiver.

Elements in FIGS. 1 to 11 which correspond to those in FIG. 12 will be denoted with the same reference numerals as those in FIG. 12. In FIG. 1, a DTV (digital television) demodulator 11 demodulates digital color TV signals from an OFDM (Orthogonal Frequency Division Multiplexing)-modulation digital color TV broadcast signal received through an antenna, such as a parabola antenna. This digital demodulation signal is supplied to a DTV decoder 12. The DTV decoder 12 decodes MPEG-2 encoded signals from the DTV demodulator 11. The decoded signal is supplied to a 1080i/720p converter 14. The 1080i/720p converter 14 converts 1080i scan format signals to 720p scan format signals by alternatively storing the odd and even fields each consisting of 540 scan lines into a frame memory, and applying a motion-adaptive processing etc.

In this embodiment, following explanations will be made inn whole for cases of converting signals from a 1080i scan format to a 720p scan format. The conventional Hi-Vision system signal also utilizes a total number of 1125 lines the same as that of the digital TV system signal. Thus, by processing 45 lines of them as lines in a non-image area, i.e., a vertical retrace period, the same circuit configuration and operation can be applied to both of the Hi-Vision system and the digital TV system.

An analog-to-digital converter (A/D converter) 15 converts the 480i scan format or the 480p scan format from analog form to digital form. A 480i(p)/720p converter 16 converts the digital signals from the A/D converter 15 from a 480i(p) scan format to a 720p scan format. Wherein, 480i scan format signals are converted into 720p scan format signal while storing odd and even fields each consisting of 240 scan lines into a field memory and performing a motion-adaptive signal processing. On the other hand, 480p scan format signals are converted into the 720p scan format signals in every fields.

A first selector 71 selects either the digital signals from the 1080i/720p converter 14 or the 480i(p)/720p converter 16. A D/A converter 18 converts the image signals selected by the first selector 71 from digital form back to analog form. Since color LCD displays require three signals, i.e., a luminance signal (Y signal) and two color-difference signals (Pr, Pb), the D/A converter 18 is actually comprised of three units (not shown).

The output of the D/A converter 18 is supplied to the first input terminal of a second selector 72. The second input terminal of the second selector 72 is supplied with external 1080i scan format analog signals of luminance signal Y and two color-difference signals Pr, Pb. The second selector 72 selects either a first set of the luminance signal and the color-difference signals supplied from the D/A converter 18 to the first input terminal, or a second set of the luminance signal and the color-difference signals supplied to the second input terminal. The set of the luminance signal and the color-difference signals selected in the second selector 72 is supplied to an LCD driver 19. The LCD driver 19 adequately processes the luminance signal Y and the color-difference signals Pr, Pb to drive an LCD panel 21. The LCD driver 19 comprises a matrix circuit for restoring three primary color signals R, G, B from the luminance signal Y and the color-difference signals Pr, Pb, a gamma correction circuit for correcting voltage-luminance characteristics curve of the LCD panel 21, a polarity alternator for alternating polarities of signals given to the LCD panel 21. Here, the alternate-driving of LCDs is performed for preventing deteriorations of LCDs caused by applying only one polarity signal to LCD panels.

An LCD controller 20 controls timings of enabling scan lines and data lines of the LCD panel 21 in synchronism with the drive signals supplied from the LCD driver 19. When the LCD panel 21 is of a low-cost and of a midrange resolution, 720 units of scan lines y1, y2, y3, . . . are vertically aligned, while 1280 units of data-lines x1, x2, x3, . . . are laterally aligned.

Figure 2:
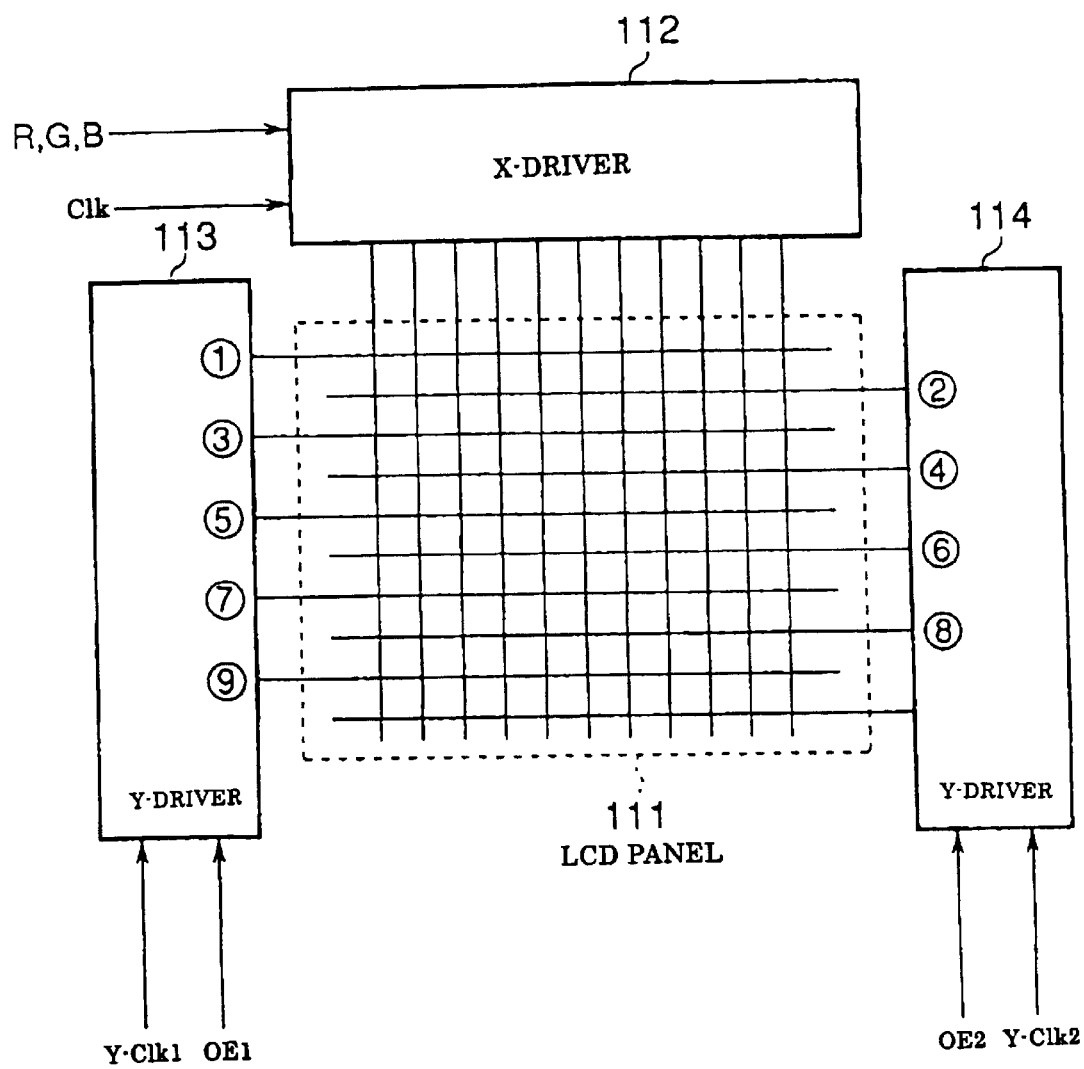
FIG. 2 is a block diagram showing the typical configuration of the LCD panel.

FIG. 2 shows a block diagram of the LCD panel 21 which is comprised of an LCD cell 111, an X-driver 112, and two Y-drivers 113, 114.

In the LCD cell 111 a plurality of LCD pixels are arrayed in a matrix with rows and columns. The X-driver 112 is a data-driver which samples analog three primary color signals R, G, B supplied from the LCD driver 19 with a sampling clock Clk, and supplies the sampled signals to the columns of the LCD cell 111 in sequence from left to right. The Y-drivers 113 and 114 are scan-drivers which are respectively comprised of a shift register. The shift registers shift downward an active drive line one by one in response to shift-up clocks Y-Clk1 and Y-Clk2 supplied from the LCD controller 20. The shift-up clocks Y-Clk1 and Y-Clk2 are supplied when output permission signals OE1 and OE2 are active, respectively.

The X-driver 112 incorporates a polarity alternator for alternating the polarity of the driving signal at a timing, for example, synchronous to the horizontal scan signal for alternate-driving the LCD cell 111. Here, the alternate-driving of LCDs is performed for preventing deteriorations of LCDs caused by applying only one polarity signal to LCD panels.

Figure 3:
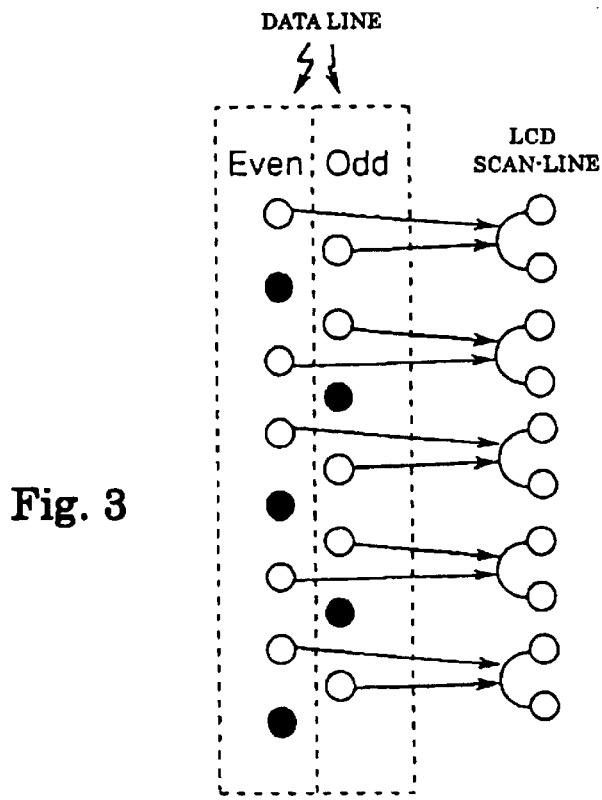
FIG. 3 is a diagram for explaining the principal operation of the first embodiment of the present invention.

Referring now to FIG. 3, a principal operation of the first embodiment according to the present invention will be described.

Figure 4:
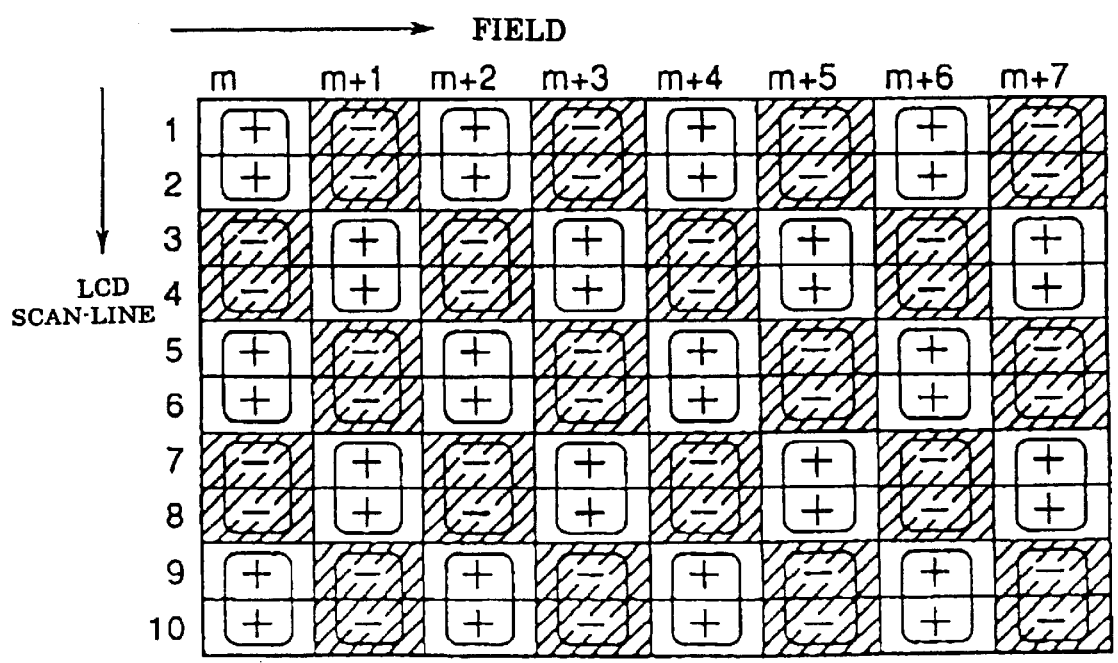
FIG. 4 is a diagram for explaining a polarity-change pattern of signals for driving the LCD panel in the first embodiment of the present invention.

In even fields (Even), the second, fifth, eighth, . . . scanning line signals are thinned out. In odd fields (Odd), the third, sixth, ninth, . . . scanning line signals are thinned out. Then remaining scanning line signals are each supplied to adjoining two data lines on the LCD panel 21. The polarities of the scanning line signals are alternated every two lines as shown in FIG. 4, and moreover the polarity is alternated in every field.

Figure 5:
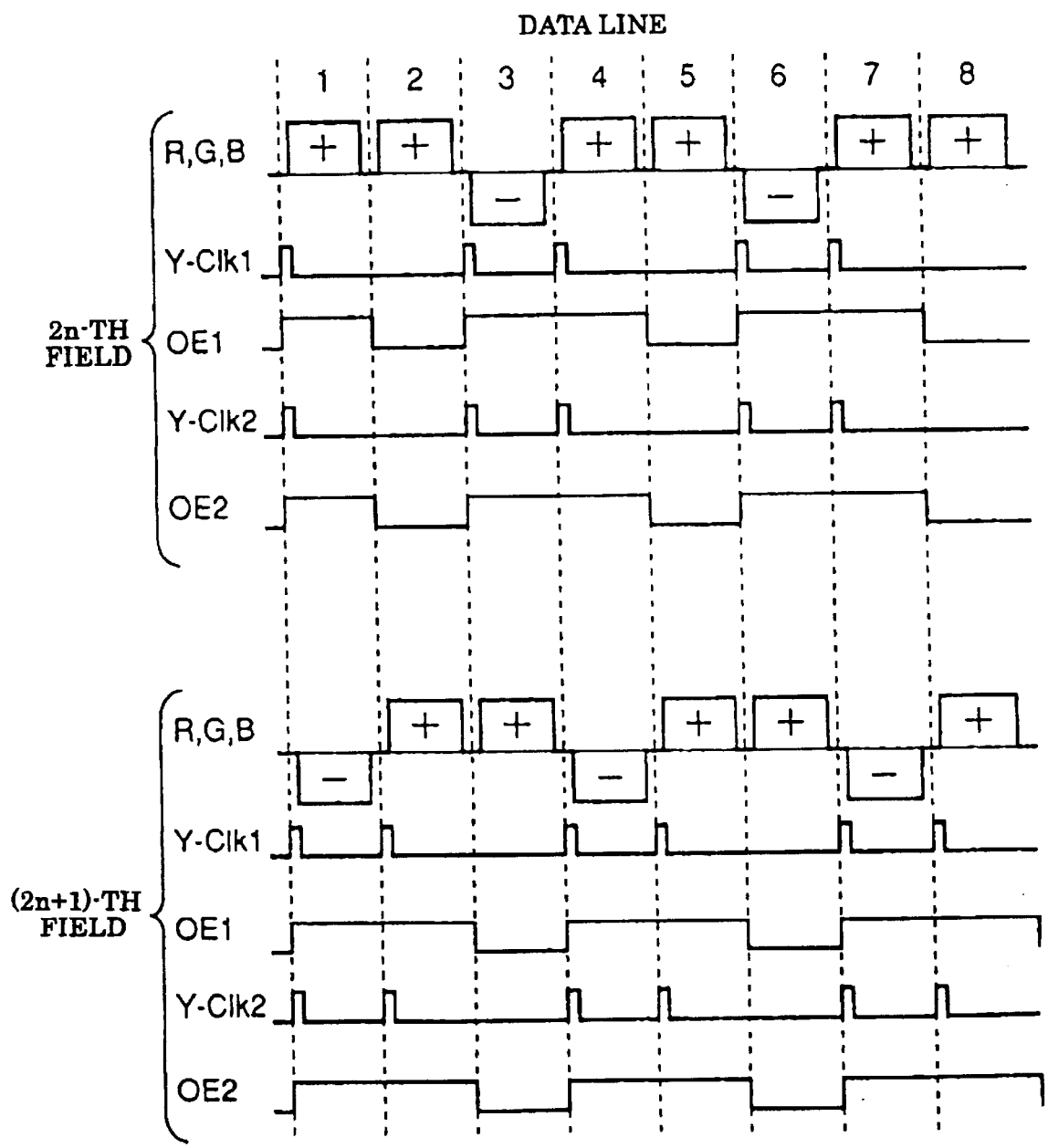
FIG. 5 is a timing diagram for driving the LCD panel in the first embodiment of the present invention.

FIG. 5 is a timing chart of signals supplied to the X-driver 112 and the Y-drivers 113, 114, as shown in FIG. 2, in order to perform the operation. In this embodiment, both of the Y-drivers 113 and 114 are supplied with the same timing signals, as shown in FIG. 5. In the even fields, i.e., the 2n-th fields, the output permission signals OE1 and OE2 are simultaneously activated at the first, third, fourth, sixth, seventh, . . . lines to permit the shift-up clocks Y-Clk1 and Y-Clk2 being supplied to the shift registers. As a result, image signals of the second, fifth, eighth, . . . lines are prohibited supply from the X-driver 112 to the LCD cell 111.

In the odd fields, i.e., the (2n+1)-th fields, the output permission signals OE1 and OE2 are simultaneously activated at the first, second, fourth, fifth, seventh, eighth . . . lines to permit the shift-up clocks Y-Clk1 and Y-Clk2 being supplied to the shift registers. As a result, image signals of the third, sixth, ninth, lines are prohibited supply from the X-driver 112 to the LCD cell 111. According to the above operations, the same signal is supplied to adjoining two data lines with the same polarity and then the polarity is alternated every field, as shown in FIGS. 3 and 4.

Although in this embodiment some of the scanning line signals are thinned out by 1/3, it is possible to drive the LCD panel 21 without thinning out the scanning line signals.

Figure 6:
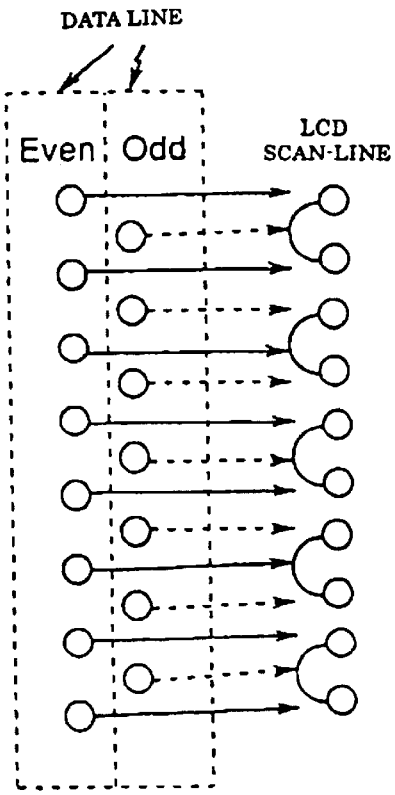
FIG. 6 is a diagram for explaining the principal operation of a second embodiment of the present invention.
Figure 7:
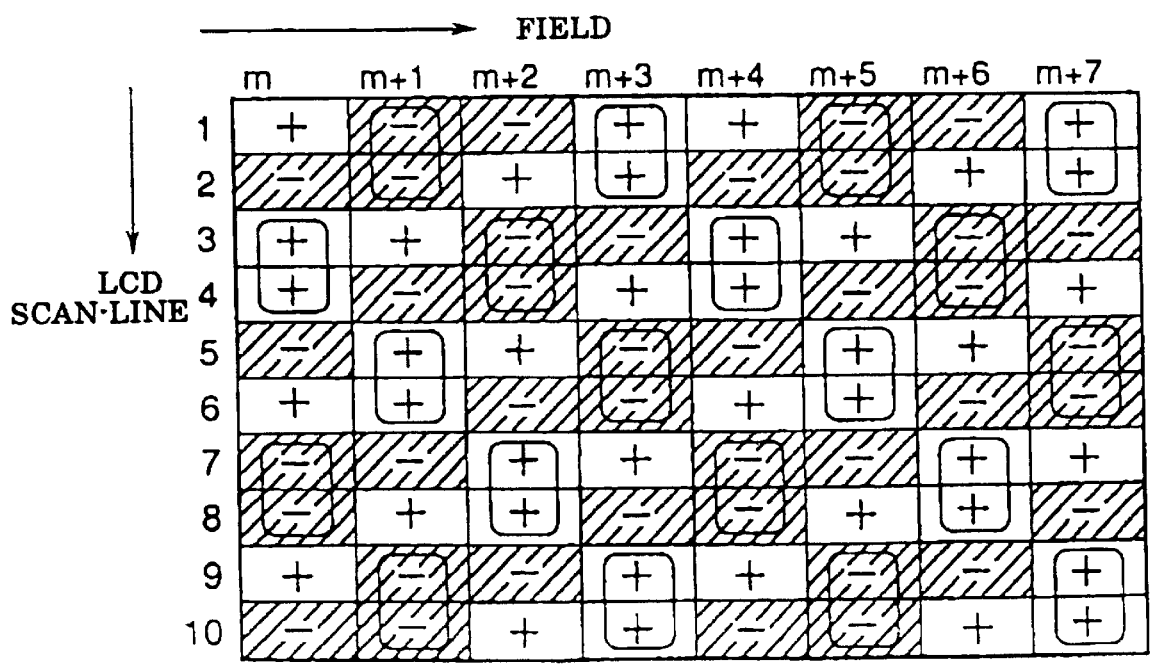
FIG. 7 is a diagram for explaining a polarity-change pattern of signals for driving the LCD panel in the second embodiment of the present invention.
Figure 8:
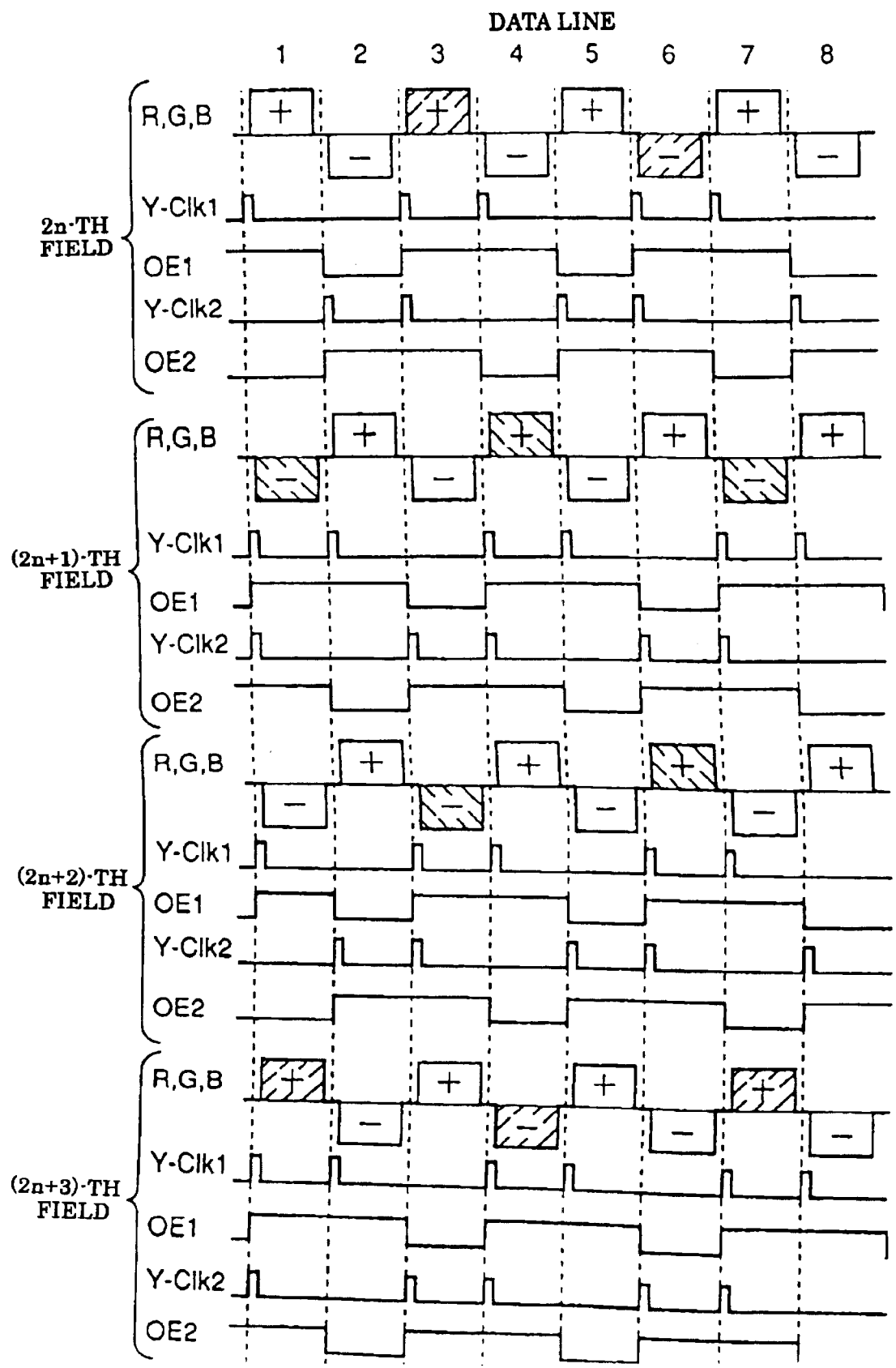
FIG. 8 is a timing diagram for driving the LCD panel in the second embodiment of the present invention.

Referring now to FIGS. 6, 7 and 8, a second embodiment, i.e., an embodiment for driving the LCD panel without thinning out of scanning line signals will be described. FIG. 6 is a diagram for explaining operations of supplying interlaced scanning line signals to the rows of the LCD panel 21, i.e., the data lines of the LCD cell 111.

In the interlaced scanning system the even fields (Even) and the odd fields (Odd) are alternately supplied to the LCD panels. In an even field (Even), a first scanning line signal is supplied to the first data line of the LCD panel. A second scanning line signal is supplied to the second data line of the LCD panel. Then a third scanning line signal is supplied to both of the third and fourth data lines of the LCD panel. Similar operations are repeated for following consecutive sets of three scanning line signals. For example, a fourth scanning line signal is supplied to the fifth data line of the LCD panel. A fifth scanning line signal is supplied to the sixth data line of the LCD panel. Then a sixth scanning line signal is supplied to both of the seventh and eighth data lines of the LCD panel.

In an odd field, a first scanning line signal is supplied to both of the first and second data lines of the LCD panel. A second scanning line signal is supplied to the third data line of the LCD panel. Then a third scanning line signal is supplied to the fourth data line of the LCD panel. Similar operations are also repeated for following consecutive sets of three scanning line signals. For example, a fourth scanning line signal is supplied to both of the fifth and sixth data lines of the LCD panel. A fifth scanning line signal is supplied to the seventh data line of the LCD panel. Then a sixth scanning line signal is supplied to the eighth data line of the LCD panel.

According to the above operations, the interlaced scanning format signals can be supplied to LCD panels with data lines 4/3 times the field scanning lines, without thinning out the scanning line signals.

FIG. 7 shows a pattern of the polarity change in the drive signals for driving the LCD panel according to the second embodiment. In FIG. 7, m-th, (m+2)-th, (m+4)-th, (m+6)-th, . . . columns represent even fields (Even), while (m+1)-th, (m+3)-th, (m+5)-th, (m+7)-th, . . . columns represent odd fields (Odd). Square frames in the diagram represent that one scanning line signal is supplied to adjoining two data lines of the LCD panel.

Moreover, in the second embodiment, the LCD panel is driven by the alternate-driving system, by alternating the polarity of the image signal every scanning line. Consequently, adjoining two data lines of the LCD panel which are supplied with the same scanning line signal are driven at the same first polarity, as shown in FIG. 7. As polarities of respective data lines on the LCD panel, e.g., the polarity change pattern of the first data line progresses in the order of "+", "−", "−", "+", "+", "−", "−", "+", . . . , the polarities of all the data lines alternate every two fields.

FIG. 8 shows timings for driving the LCD panel in the second embodiment of the present invention. In FIG. 8, the FIGS. 1, 2, . . . 8 on the lateral axis represent the ascending order of the data lines of the LCD panel.

In a 2n-th field, after the first data line has changed positive the polarities of the other data lines are change alternatively. The output permission signal OE1 supplied from the LCD controller 20 to the Y-driver 113 turns ON at the periods of the first, third, fourth, sixth, seventh, . . . data lines. Consequently, the shift-up clock Y-Clk1 is supplied to the Y-driver 113 for driving the first, third, fourth sixth, seventh, . . . data lines. Likewise, the output permission signal OE2 supplied from the LCD controller 20 to the Y-driver 114 turns ON at the periods of the second, third, fifth, sixth, eighth, . . . data lines. Consequently, the shift-up clock Y-Clk2 is supplied to the Y-driver 114 for driving the second, third, fifth, sixth, eighth, . . . data lines. According to above operations, the 2n-th field, i.e. the even field scanning line signals can be supplied to LCD panels, without thinning out the scanning line signals.

In a (2n+1)-th field, after the first data line has changed negative the polarities of the other data lines are changed alternatively. The output permission signal OE1 supplied from the LCD controller 20 to the Y-driver 113 turns ON at the periods of the first, second, fourth, fifth, seventh, eighth, . . . data lines. Consequently, the shift-up clock Y-Clk1 is supplied to the Y-driver 113 for driving the first, second, fourth, fifth, seventh, eighth, data lines. Likewise, the output permission signal OE2 supplied from the LCD controller 20 to the Y-driver 114 turns ON at the periods of the first, third, fourth, sixth, seventh, . . . data lines. Consequently, the shift-up clock Y-Clk2 is supplied to the Y-driver 114 for driving the first, third, fourth, sixth and seventh, . . . data lines. According to above operations, the (2n+1)-th field (Odd field) scanning line signals can be supplied to LCD panels, without thinning out the scanning line signals.

Similar operations are repeated in the timing control of writing data into the data lines on the LCD panel, in the (2n+2)-th and later fields. For example, in the (2n+2)-th field, after the first data line has changed negative the polarities of the other data lines change alternatively. The output permission signal OE1 supplied from the LCD controller 20 to the Y-driver 113 turns ON at the periods of the first, third, fourth, sixth, seventh, . . . data lines. Consequently, the shift-up clock Y-Clk1 is supplied to the Y-driver 113 for driving the first, third, fourth sixth, seventh, data lines. Likewise, the output permission signal OE2 supplied from the LCD controller 20 to the Y-driver 114 turns ON at the periods of the second, third, fifth, sixth, eighth, . . . data lines. Consequently, the shift-up clock Y-Clk2 is supplied to the Y-driver 114 for driving the second, third, fifth, sixth, eighth, . . . data lines. According to above operations, the (2n+2)-th field (Even) scanning line signals can be supplied to LCD panels, without thinning out the scanning line signals.

In a (2n+3)-th field, after the first data line has changed positive the polarities of the other data lines are changed alternatively. The output permission signal OE1 supplied from the LCD controller 20 to the Y-driver 113 turns ON at the periods of the first, second, fourth, fifth, seventh, eighth, . . . data lines. Consequently, the shift-up clock Y-Clk1 is supplied to the Y-driver 113 for driving the first, second, fourth, fifth, seventh, eighth, . . . data lines. Likewise, the output permission signal OE2 supplied from the LCD controller 20 to the Y-driver 114 turns ON at the periods of the first, third, fourth, sixth, seventh, . . . data lines. Consequently, the shift-up clock Y-Clk2 is supplied to the Y-driver 114 for driving the first, third, fourth, sixth and seventh, . . . data lines. According to above operations, the (2n+3)-th field (Odd field) scanning line signals can be supplied to LCD panels, without thinning out the scanning line signals.

Figure 9:
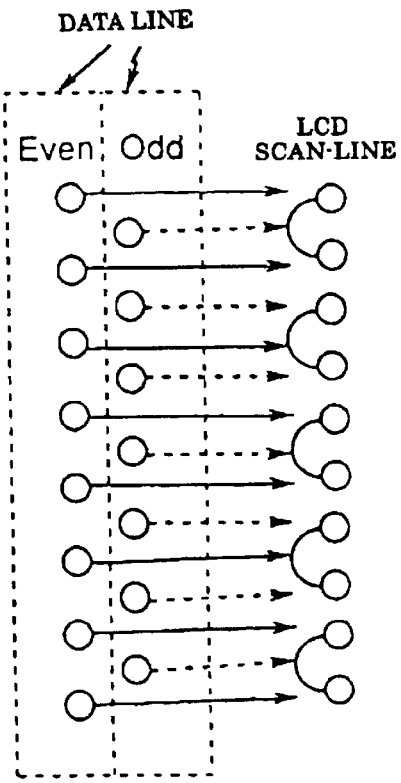
FIG. 9 is a diagram for explaining the principal operation of a third embodiment of the present invention.

Referring now to FIGS. 9, 10 and 11, a third embodiment, i.e., another embodiment for driving of the LCD panel without thinning out of scanning line signals will be described.

FIG. 9 is a diagram for explaining operations of writing interlaced scanning line signals into the rows of the LCD panel 21, i.e., the data lines of the LCD cell 111. In FIG. 9, the writing operations are equivalent to that carried out in FIG. 6. That is, in an even field (Even), a first scanning line signal is supplied to the first data line of the LCD panel. A second scanning line signal is supplied to the second data line of the LCD panel. Then a third scanning line signal is supplied to both of the third and fourth data lines of the LCD panel. Similar operations are repeated for following consecutive sets of three scanning line signals, e.g., the set of the fourth, fifth, sixth scanning line signals. In an odd field, a first scanning line signal is supplied to both of the first and second data lines of the LCD panel. A second scanning line signal is supplied to the third data line of the LCD panel. Then a third scanning line signal is supplied to the fourth data line of the LCD panel. Similar operations are also repeated for following consecutive sets of three scanning line signals, e.g., the set of the fourth, fifth, sixth scanning line signals.

In this third embodiment, a pattern of the polarity change in the drive signals for driving the LCD panel differs from the pattern of the polarity change in the second embodiment. FIG. 10 shows the polarity-change pattern of the drive signal for driving the LCD panel in the third embodiment. As understood by comparing the polarity-change pattern in FIG. 10 with that in FIG. 7, the polarity of every data line changes at the shift of the fields in this third embodiment. On the one hand, the polarity alternates along the columns of the LCD cell in every two data lines. Consequently, the pairs of positive data lines and the pair of negative data lines are distributed in a checkered pattern, as shown in FIG. 10.

FIG. 11 shows timings for driving the LCD panel in the third embodiment of the present invention. In FIG. 11, the FIGS. 1, 2, . . . 8 on the lateral axis represent the ascending order of the data lines of the LCD panel. In the 2n-th, after the first two data lines, i.e., the first and second data lines have changed positive the polarity of the following data line, i.e., the third data line is changed negative. In odd fields, after the first data line has changed negative the polarities of the following two data lines, i.e., the second and third data lines are changed positive. Similar operations are consecutively repeated in every three data lines. That is, positive R, G, B image signals are supplied to, e.g., the fourth and fifth data lines, while negative R, G, B image signals are supplied to the sixth data line. When the positive R, G, B image signals are supplied, the output permission signals OE1 and OE2 are alternately enabled or disabled to permit or prohibit the shift-up clocks Y-Clk1 and Y-Clk2. Therefore, when the R, G, B image signals are positive, the shift-up clocks Y-Clk1 and Y-Clk2 are alternately supplied to the Y-drivers 113 and 114. According to above operations, the 2n-th field, i.e. the even field scanning line signals can be supplied to LCD panels in similar to the operations in FIG. 6, without thinning out the scanning line signals.

When the R, G, B image signals are negative, the output permission signals OE1 and OE2 are simultaneously turned ON to permit both of the shift-up clocks Y-Clk1 and Y-Clk2 being supplied to the Y-drivers 113 and 114. Thereby, the image signal supplied from the X-driver 112 is displayed on the adjoining two data lines of the LCD panel at the same time.

In odd fields, after the first data line has changed negative the polarities of the following two data lines, i.e., the second and third data lines are changed positive.

When the image signals are negative, the output permission signals OE1 and OE2 are simultaneously turned ON to enable the shift registers. Thus the Y-drivers 113 and 114. shift-up the active data line in response to the shift-up clocks Y-Clk1 and Y-Clk2. Thereby, the image signal supplied from the X-driver 112 is displayed on the adjoining two data lines of the LCD panel at the same time.

When the image signal is positive, the output permission signals OE1 and OE2 are alternatively turned ON, and the shift-up clocks Y-Clk1 and Y-Clk2 are also alternatively supplied to the Y-drivers. Thereby, the image signal of one scanning line is written from the X-driver 112 to the LCD cell 111 line by line.

Consequently, the pairs of positive data lines and the pair of negative data lines are distributed in a checkered pattern, as shown in FIG. 10. In one field the pairs of positive data lines and pair of negative data lines appear alternatively along the columns of the LCD cell 111, and then the polarities of the pairs are changed in the following field.

The number of scanning lines in each field increases 4/3 times in all of the first, second and third embodiments. In other word, the number of scanning lines decreases 2/3 times in the unit of frame. For example, after the number of frame scanning lines has been reduced from 1080 lines to 720 lines, the progressive scanning system and the alternate-polarity driving are realized.

Although the present invention has been described in relation to the LCD panel, the object of the present invention is not limited to the LCD panel. That is, the present invention is applicable to, e.g., a plasma display, a digital micro-mirror device display, etc. Moreover although the embodiments of writing 1080i or 1035i format analog signals to the LCD panel with 720 data lines are exemplified in the above description, it is able to control the write-timing even in cases different in the number of scanning lines, the number of pixels, and the magnification factor, and thus they also fall into the scope of the present invention.

As described above, the present invention can provide a matrix display apparatus which can write 1080i scan format signals into LCD panels with 720 data lines without the need for expensive A/D converters and scanning line converters, and thus the cost of the matrix display apparatus is extensively reduced.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the beat mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A matrix display apparatus, comprising:

a display panel device provided with a plurality of data-lines and a plurality of scan-lines which are arranged in a matrix; and a controller for controlling the display panel device, wherein the controller generates a write instruction signal,
   (i) for instructing a 3(n+1)-th scanning line image signal a signal to be written on adjoining two scan-lines (n is zero or a positive integer);
   (ii) for instructing each of the other scanning line image signals of the first field image signal to be written on one of the scan-lines;
   (iii) for instructing a (3n+1)-th scanning line image signal of a second image signal to be written on adjoining two scan-lines; and
   (iv) for instructing each of the other scanning line image signals of the second field image signal to be written on one of the scan-lines.

2. A matrix display apparatus, comprising:

a display panel device provided with a plurality of data-lines and a plurality of scan-lines which are arranged in a matrix; and a controller for controlling the display panel device, a data-driver for supplying an interlaced format image signal to the data-lines of the display panel device in accordance with a write instruction signal provided from the controller; and a scan-driver for shifting an active scan-line in the vertical direction of the display panel device in accordance with the line-shift instruction signal provided from the controller, wherein the controller generates a write instruction signal,
   (i) for instructing a (3n+3)-th scanning line image signal of a first field image signal to be written on adjoining two scan-lines (n is zero or a positive integer);
   (ii) for instructing each of the other scanning line image signals of the first field image signal to be individually written on their corresponding single scan-line;
   (iii) for instructing a (3n+1)-th scanning line image signal of a second field image signal to be written on adjoining two scan-lines; and
   (iv) for instructing the other scanning line image signals of the second field image signal to be individually written on their corresponding single scan-line.

3. A matrix display apparatus as claimed in claim 2, further comprising:

an LCD (liquid-crystal display) panel device and a polarity alternator for alternating the polarity of the image signal to be provided to the LCD panel device for every horizontal scanning line;

wherein the polarity alternator:
   (i) renders the image signals in (4m+1)-th and (4m+4)-th (m is zero or a positive integer) fields in time sequence to the first polarity; and
   (ii) renders the image signal in (4m+2)-th and (4m+3)-th fields in time sequence to the second polarity.

4. A matrix display apparatus as claimed in claim 2, further comprising:

an LCD (liquid-crystal display) panel device and a polarity alternator for alternating the polarity of the image signal to be supplied to the LCD panel device for every horizontal scanning line;

wherein the polarity alternator:
(i) renders (3n+1)-th and (3n+2)-th scanning line image signals in the first field to the first polarity;
(ii) renders the (3n+3)-th scanning line image signal in the first field to the second polarity;
(iii) renders the (3n+1)-th scanning line image signals in the second field to the second polarity; and
(iv) renders the (3n+2)-th and (3n+3)-th scanning line image signal in the second field to the first polarity.

* * * * *